United States Patent [19]

Possati et al.

[11] Patent Number: 5,083,384
[45] Date of Patent: Jan. 28, 1992

[54] DEVICE FOR CHECKING LINEAR DIMENSIONS OF PARTS

[75] Inventors: Mario Possati, Bologna; Carlo Dall'Aglio, Volta Reno di Argelato, both of Italy

[73] Assignee: Marposs Societa' per Azioni, S. Marino di Bentivoglio, Italy

[21] Appl. No.: 466,377

[22] PCT Filed: Sep. 12, 1988

[86] PCT No.: PCT/EP88/00829
§ 371 Date: Mar. 15, 1990
§ 102(e) Date: Mar. 15, 1990

[87] PCT Pub. No.: WO89/03508
PCT Pub. Date: Apr. 20, 1989

[30] Foreign Application Priority Data

Oct. 9, 1987 [IT] Italy .................. 3637 A/87

[51] Int. Cl.⁵ .............. G01B 7/12; G01B 5/12; G01B 3/46
[52] U.S. Cl. ........................... 33/542; 33/783; 33/832
[58] Field of Search ............ 33/542, 705, 703, 832, 33/544.3, 544.2, 544.1, 783

[56] References Cited

U.S. PATENT DOCUMENTS

| | | | |
|---|---|---|---|
| 3,571,934 | 3/1971 | Buck, Sr. | 33/832 |
| 4,386,467 | 6/1983 | Possati et al. | 33/542 |
| 4,447,960 | 5/1984 | Golinelli et al. | 33/783 |
| 4,493,153 | 1/1985 | Esken | 33/542 |
| 4,679,332 | 7/1987 | Lutite | 33/832 |
| 4,787,149 | 11/1988 | Possati et al. | 33/783 |
| 4,907,345 | 3/1990 | Dall'Aglio et al. | 33/544.3 |
| 4,910,879 | 3/1990 | Golinelli et al. | 33/832 |

FOREIGN PATENT DOCUMENTS

| | | |
|---|---|---|
| 3003370 | 1/1982 | Fed. Rep. of Germany . |
| 3207837 | 11/1982 | Fed. Rep. of Germany . |
| 3303698 | 9/1983 | Fed. Rep. of Germany . |
| 628400 | 8/1949 | United Kingdom . |

Primary Examiner—William A. Cuchlinski, Jr.
Assistant Examiner—C. W. Fulton
Attorney, Agent, or Firm—Stevens, Davis, Miller & Mosher

[57] ABSTRACT

Device comprising a support (50) with a seat (51) housing a measuring cell (53) with a movable armset (54) having a feeler (61) adapted to contact the part to be checked. In order to reduce the overall dimensions of the device, while guaranteeing the seat sealing and the stiffness of the movable armset, the seat (51) is closed by a metal lamina (62) coupled to the support (50) and a resilient seal (64) coupled to the metal lamina (62) and the feeler (61).

10 Claims, 2 Drawing Sheets

DEVICE FOR CHECKING LINEAR DIMENSIONS OF PARTS

DESCRIPTION

1. Technical Field

The invention relates to a device for checking linear dimensions of parts, with support and protection means comprising a rigid support defining an open recess; a movable member housed within said recess; a feeler adapted to contact the part to be checked and to consequently cause displacements of the movable member; detecting means associated with the movable member for providing a signal depending on the feeler position; and closure and sealing means including at least two elements having relevant openings for the feeler passage, the first element being secured to the support and the second element being a resilient seal secured—in correspondence with the relevant opening—to the feeler, for sealingly closing said opening while permitting the displacements of the movable member and of the feeler.

The invention also relates to a plug gauge for checking internal diameters of parts, with a support structure; a protection structure secured to the support structure and having an opening recess; two movable arms arranged within the protection structure, substantially along a longitudinal direction, and having feelers protruding with respect to the openings of the protection structure, for contacting diametrically opposite points of the part to be checked; position transducer means associated with the movable arms; and sealing means coupled to the feelers for sealingly closing said open recess.

2. Background Art

For the devices for checking linear dimensions of parts—in particular for the electronic comparator guages with direct contact feelers for checking diameters, thickness and other linear dimensions—there is generally the need of preventing dust, coolants, swarf and other foreign matter from entering into the same devices so reaching delicate movable elements, transducers, etc. For this purpose there are used resilient sealing elements secured to the device casing and to the feeler, or to the movable arm carrying the feeler.

German patent application DE-Al-3303698 discloses a gauge including two movable arms carrying relevant feelers, and—for each movable arm—two seals, both secured to the gauge casing as well as to the movable arm and having openings for the passage of the movable arm. The outermost seal comprises a core made of metal cloth or textile fibre and a rubber coating, the inner seal is made of rubber.

European patent application EP-Al-0102744 discloses a measuring head comprising metal bellows, one of which performing several functions, among which that of sealing element between the head casing and the arm carrying the feeler.

Often there arises the need of manufacturing checking devices having very small dimensions, at least as far as the means for measurement detection and the relevant housings or casings are concerned. For example, if it is necessary to provide an electronic plug gauge for checking the diameter of small holes, such as holes having nominal diameter smaller than 8 mm, it is clearly difficult to find a compromise among the needs of protection and sealing and those of accuracy and repeatability. This problem considerably grows if the measurements must be performed at considerable depths, for example higher than 25 mm.

The devices described in the above mentioned patent applications, DE-Al-3303698 and EP-Al-0102744, have structures of the casings and of the sealing means unsuitable for solving the problem referred to above. In particular, the external casings are rather bulky.

The structure of the plug gauge described in U.S. Pat. No. 4447960 is bulky, too. In particular, this gauge has a protection nosepiece, substantially cylindrical, that takes considerable room in a radial direction, wherefore the gauge is not adapted for checking holes having small diameters.

Moreover, European patent application EP-Al-0129741 discloses a device having a measuring cell including a radially movable feeler adapted to cooperate at an end with the part and at the other end with a free end of a longitudinal flexible lamina whereto there is fixed a strain gauge position transducer. The rather compact measuring cell is housed within a side recess of a support. This recess is sealingly closed by a rigid cover, with a substantially C-shaped cross-section, a sealing ring arranged between the cover and the support, and a resilient seal, having an opening for the feeler passage and secured to the cover and the feeler. The overall dimensions may be rather small, but a limitation is due to the size of the cover, that requires a sufficient depth of the recess.

DISCLOSURE OF INVENTION

Object of the invention is to solve the previously described problem.

According to the invention, the or each recess housing the movable member or arm and the detection means of a device or gauge for checking linear dimensions of parts is sealingly closed by a first element obtained by a metal sheet and a second element consisting of a resilient seal. The metal sheet has an edge fixed to the support defining said recess and the resilient seal has an edge fixed to the first element and another edge fixed to the movable member or arm.

The invention makes it possible to manufacture devices having external casings very stiff, but with limited weight and overall dimensions, sturdy and rigid movable members and protection and sealing means that—besides effectively performing their specific functions—have very small overall dimensions—such as not to cause a substantial increase of the overall dimensions due to the external casings—and suitable resiliency, for permitting the displacements of the movable members carrying the feelers with small values of the return forces and of the contact forces between the feelers and the parts.

The effects and advantages offered by the invention are that measurements in zones of very small accessiblity are possible, a plurality of simultaneous measurements in points very close to one another can be performed by relevant feelers, and even parts made of rather soft material can be checked in view of the small contact forces. Moreover, the invention can be actuated by very cheap materials and processings.

BRIEF DESCRIPTION OF DRAWINGS

The invention is described in more detail hereinafter, with reference to the annexed drawings, that show two preferred embodiments of the invention, the first relating to an electronic plug gauge for checking an internal diameter by means of two feelers and the second to the construction of a measuring cell having a single feeler.

BEST MODES OF CARRYING OUT THE INVENTION

Figure 1:
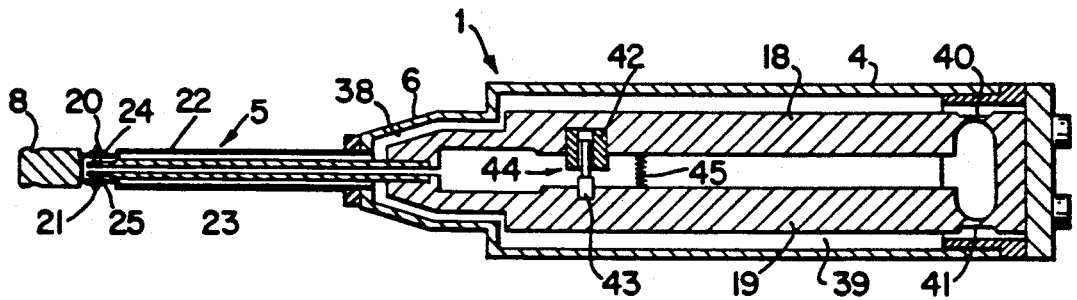
FIG. 1 is a longitudinal section of an electronic plug gauge having two feelers, for checking a small internal diameter at a considerable depth.
Figure 2:
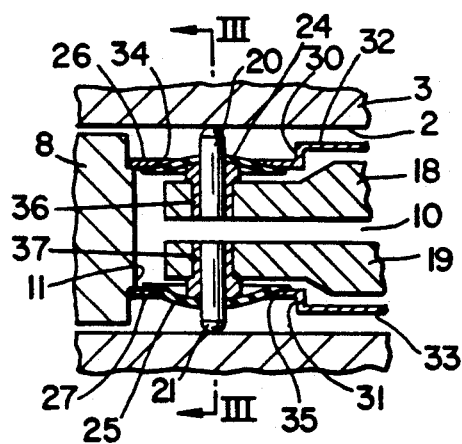
FIG. 2 shows, with a scale enlarged with respect to that of FIG. 1, a detail of the longitudinal section of FIG. 1 and a portion of a part of which an internal diameter must be checked.

The electronic plug gauge 1 shown in FIGS. 1 to 4 is designed for checking, in transfer lines, internal diameters having small nominal value, for example a value between 6 and 8 mm, and at a considerable measurement depth, for example a depth between 40 and 60 mm.

The gauge 1 is normally mounted on a slide that, starting from a rest position, advances it to the measurement position. Preferably, the gauge 1 is secured to the slide by a floating suspension permitting small transversal displacements, for making easier the insertion of the plug end into a hole 2 of a part 3.

The gauge 1 substantially comprises, along its longitudinal development, three portions 4, 5 and 6 providing support and protection structures. The end portion 4—having the highest transversal overall dimension—is fixed to the slide, portion 5—at the other end—has the smallest transversal overall dimension and is intended for insertion into hole 2, and portion 6 connects the end portions 4 and 5.

Portion 5 comprises a protection and centering nosepiece constituted by a first end section 8, with a substantially solid cross-section and a substantially spheric tapered end and a guiding part, and a second section—arranged between section 8 and portion 6—where the nosepiece has a diametral or through slot or open recess 10 that is elongated longitudinally along the above-mentioned second section apart from a short part 11 adjacent to section 8 and a short part adjacent to portion 4.

Recess 10 is delimited by internal flat faces of two longitudinal parts 7', 7" of the nosepiece, that have external surfaces 12, 12' constituted by portions of a spherical surface having a diameter equal to the maximum diameter of section 8. This diameter is slightly smaller than the nominal diameter of hole 2 to permit the nosepiece entering into the same hole 2 and guarantee a sufficiently accurate centering.

Figure 3:
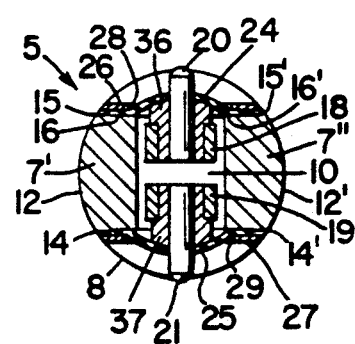
FIG. 3 is a cross-section of the detail of FIG. 2, along path III—III of FIG. 2.
Figure 4:
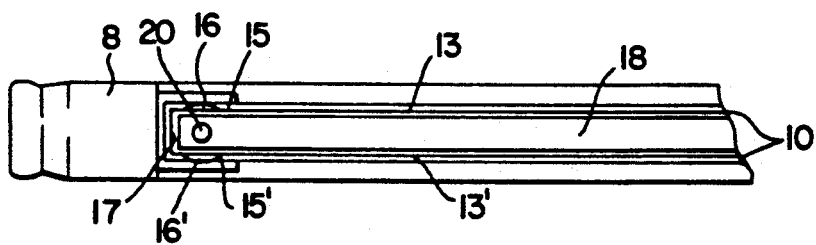
FIG. 4 is a plan view of a detail of the gauge of FIGS. 2 and 3, shown without some sealing elements and with a scale different from those of the preceding figures.

In correspondence with the transversal ends of recess 10 and of a zone of part 11 adjacent to these transversal ends, the nosepiece has chamfers defining abutment seats, some of which are indicated in FIGS. 3 and 4 by references 13, 13', 14, 14', 15, 15', 16, 16' and 17, while further equivalent seats are not designated by references, for not unduly complicating the figures.

Recess 10 houses two movable arms 18, 19 carrying feelers 20, 21 adapted for contacting diametrically opposite points of hole 2.

Recess 10 is sealingly closed by sealing means including two metal laminae 22, 23, made of steel sheet for springs, and two seals 24, 25 constituted by cores in textile natural or artificial fibre and rubber coatings.

Metal laminae 22, 23 include first longitudinal portions 26, 27 with round holes 28, 29 for the passage of feelers 20, 21, second radial portions 30, 31 and third longitudinal portions 32, 33. Seats 13, 13', 14, 14', 15, 15', 16, 16' and 17 have outlines corresponding to those of portions 26, 27, 30, 31, 32 and 33 and laminae 22, 23 are glued onto them by silicone adhesive.

In correspondence with the zones joining portions 5 and 6, too, there are foreseen suitable seats—not shown for simplicity's sake—for sealingly glueing laminae 22, 23.

Seals 24, 25, substantially convex, define holes 34, 35 for the passage of feelers 20, 21. In correspondence with the edges of holes 34, 35, seals 24, 25 are glued, for example by an epoxy resin—such as "Araldite"—, to flat abutment surfaces of two bored blocks 36, 37 that join feelers 20, 21 to movable arms 18, 19.

The external, flat edges of seals 24, 25 are glued by "Araldite" to two annular internal surfaces of laminae 22, 23, in correspondence with the edges of holes 28, 29.

Movable arms 18, 19 have reduced thickness in correspondence with feelers 20, 21 and, as far as their portions arranged within portion 5 are concerned, are substantially parallel, along the longitudinal direction. Movable arms 18, 19 diverge in correspondence with a recess 38 of portion 6 and are substantially parallel in correspondence with a recess 39 of portion 4.

Movable arms 18, 19 can perform limited rotational displacements about fulcrums 40, 41 arranged within recess 39 and carry, also within recess 39, two elements 42, 43 of a differential transformer position transducer 44, that provides a signal depending on the mutual position of movable arms 18, 19, by means of a cable—not shown—connected to a power supply, detecting and display electronic unit, it too not shown.

A spring 45, arranged within recess 39, urges movable arms 18, 19 to rotate, biassing feelers 20, 21 against the surface of hole 2. The contact force of feelers 20, 21 against part 3 and the return forces for displacing movable arms 18, 19 to the rest position are basically determined by spring 45, while the component due to the deformations of seals 24, 25 can be limited to 10–20%.

It is evident that the use of an open nosepiece, including two longitudinal portions 7', 7" having a thickness sufficient to provide a high stiffness, and the sealing of the nosepiece by laminae 22, 23 and seals 24, 25 permit—the nominal diameter of the hole 2 to be checked remaining the same—the use of movable arms 18, 19 of a higher thickness and consequently higher stiffness, thus improving the accuracy and repeatability of the measurements. In fact, laminae 22, 23 and seals 24, 25 can have thickness smaller than 0.5 mm, in particular a thickness of 0.2 mm for the laminae and a 0.4 mm thickness for seals 24, 25. If a closed and massive nosepiece were used, the room available for the movable arms would be considerably reduced.

Figure 5:
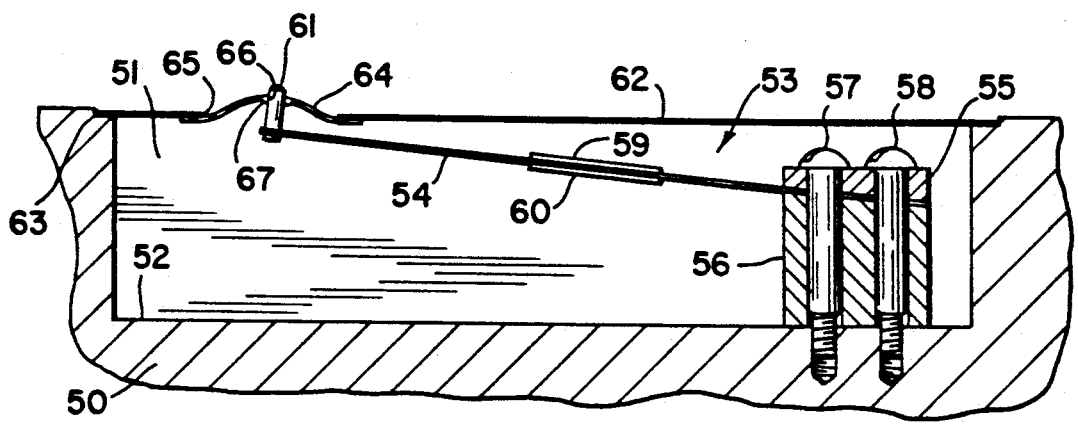
FIG. 5 is a longitudinal section of an electronic comparator gauge comprising a support housing a strain gauge measuring cell, according to another embodiment of the invention.
Figure 6:
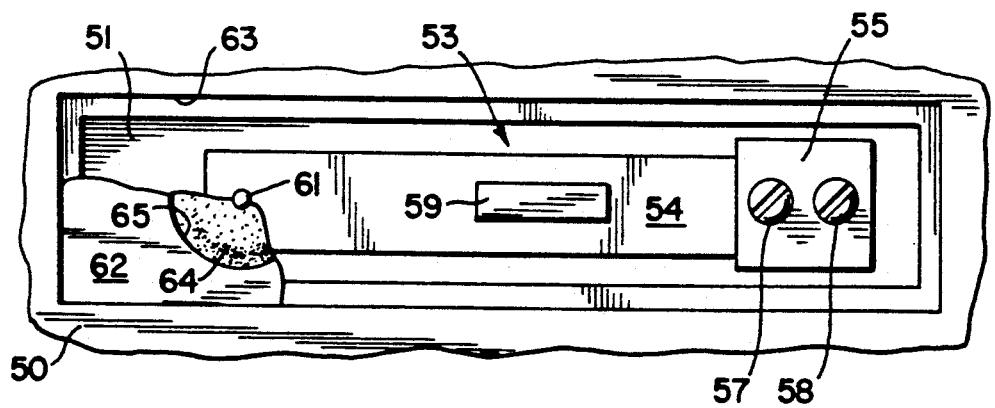
FIG. 6 is a plan view of the device of FIG. 5, with some sealing elements shown partially for convenience of illustration.

Similar remarks apply for the embodiment of the invention shown in FIGS. 5 and 6, that refer to a device including a measuring cell with a strain gauge position transducer.

Support and protection means include a metal rigid support body 50, prismatic or cylindrical, defining a seat or recess 51 having the shape of an open box, with a bottom surface constituting an abutment seat 52.

Within recess 51 there is housed a measuring cell 53 comprising a movable member or armset, i.e. a resilient lamina 54, made of steel sheet, having an end fixed to body 50 by blocks 55, 56 and screws 57, 58. Detecting means consisting of strain gauges 59, 60 are glued, respectively, to the two faces of the intermediate part of lamina 54 and a feeler 61 adapted for contacting the part to be checked is secured to the lamina free end.

Strain gauges 59, 60 are connected, through wires not shown, to a bridge detection circuit, per se known, that provides at its output a signal depending on the bending of lamina 54 and therefore on the position of feeler 61 and the part dimensions.

Closure and sealing means comprise a rectangular metal lamina 62 having its edges glued, by silicone adhesive, within a recess 63 of body 50, next to recess 51. The outer edge of a rubber resilient seal 64 is glued, by means of "Araldite", to the lower face of lamina 62, in correspondence with the edge of a round hole 65. Seal 64 has substantially concave shape, with a central circular hole 66 for the passage of feeler 61. In correspondence with hole 66, seal 64 has an annular bead 67, for its coupling to feeler 61, by means of silicone adhesive. Lamina 62 and seal 64 are shown only partially in FIG. 6, in order to render visible the inside of the device.

The thickness of lamina 62 is preferably of 0.2 mm and that of seal 64 of 0.4 mm. Lamina 62 and seal 64 sealingly close recess 51. Feeler 61 can be displaced from the rest position, as a consequence of the contact with the part to be checked, due to the resilient deformation of lamina 62. Lamina 62, in view of its flat shape and its fixing along all its edges, is not subjected to substantial deformations, i.e. deformations of ample amount. The contact force of feeler 61 against the part and the return force for returning lamina 62 and feeler 61 to the rest positions are mainly provided by the resilient forces originated in the lamina 62, while the component due to the deformation of seal 64 can be limited, for example, to 10%. Resilient seal 64 can also comprise a cloth core and a rubber coating.

We claim:

1. Device for checking linear dimensions of parts, with support and protection means comprising a rigid support (50) defining an open recess (51); a movable member (54) housed within said recess (51); a feeler (61) adapted to contact the part to be checked and to consequently cause displacements of the movable member (54); detecting means (59, 60) associated with the movable member (54) for providing a signal depending on the position of the feeler (61); and closure and sealing means including at least two elements (62, 64) having relevant openings (65, 66) for the feeler passage, the first element (62) being secured to the support (50) and the second element being a resilient seal (64) having an edge fixed to the first element, next to the opening (65) of the first element, the resilient seal (64) being secured—in correspondence with the relevant opening (66)—to the feeler (61), for sealingly closing said opening (66) while permitting the displacements of the movable member (54) and of the feeler (61), characterized in that the first element (62) is obtained by a resilient metal sheet having a thickness smaller than 0.5 mm and its peripheral edges fixed to the support (50) next to said recess (51).

2. A device according to claim 1, wherein said first element (62) has a substantially flat shape and constant thickness.

3. A device according to claim 2, wherein the edges of the first element (62) are glued to the support (50).

4. A device according to claim 3, wherein the edges of said resilient seal (64) are glued to the first element (62).

5. A device according to claim 1, wherein the first element (62) is obtained by a steel lamina for springs.

6. A device according to claim 1, wherein the first element (62) has a thickness of about 0.2 mm.

7. A device according to claim 1, wherein the resilient seal (64) comprises a cloth core and a rubber coating.

8. Plug gauge (1) for checking internal diameters of parts, with a support structure (4, 6); a protection structure (5) secured to the support structure (4, 6) and having an open recess (10), said protection structure (5) having its external side surface with opposite longitudinal chamfers (13–15, 13'–15'), for locally reducing the transversal overall dimensions, the chamfers being adjacent to said recess (10); two movable arms (18, 19) housed within the protection structure (5), substantially along a longitudinal direction, at least for a part of their length, and having feelers (20, 21) protruding with respect to the recess (10) of the protection structure (5), for contacting diametrically opposite points of the part to be checked; position transducer means (44) associated with the movable arms (18, 19); and sealing means (22, 23, 24, 25) coupled to the feelers (20, 21) for sealingly closing said recess (10), said sealing means comprising two distinct sealing elements (22, 23) having relevant holes (26, 27), and two resilient seals (24, 25), each of which has a hole (28, 29) for the passage of a relevant feeler (20, 21) and is fixed to a relevant sealing element (22, 23) next to the edge of the hole (26, 27) of the sealing element (22, 23), characterized in that said sealing elements (22, 23) comprise relevant portions of resilient metal sheet having a thickness lower than 0.5 mm, said portions having their external edges fixed in correspondence with the longitudinal chamfers (13, 13', 14, 14').

9. A gauge according to claim 8, wherein the protection structure is constituted by a nosepiece comprising two rigid longitudinal portions (7', 7'') seperated by said open recess (10), the nosepiece defining, next to the open recess (10), two opposite seats (13, 13', 14, 14') for respectively housing the external edges of the two distinct portions (22, 23) of said metal sheet.

10. A gauge according to claim 9, wherein said metal sheet portions (22, 23) are of steel and are glued onto said seats, the seals (24, 25) being in their turn glued to the metal sheet portions (22, 23) and to the feelers (20, 21).

* * * * *